May 26, 1942.  G. T. LAMPTON ET AL  2,284,154
AUTOMATIC CONTROLLABLE PITCH PROPELLER
Filed July 16, 1937  7 Sheets-Sheet 4
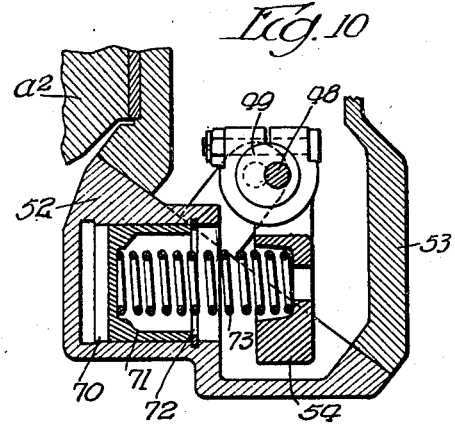
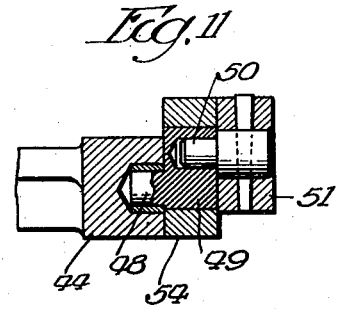
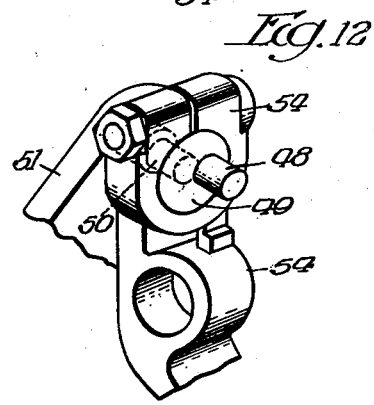
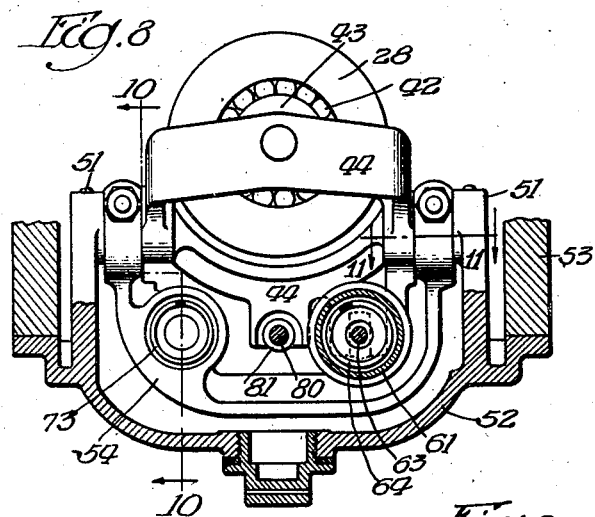
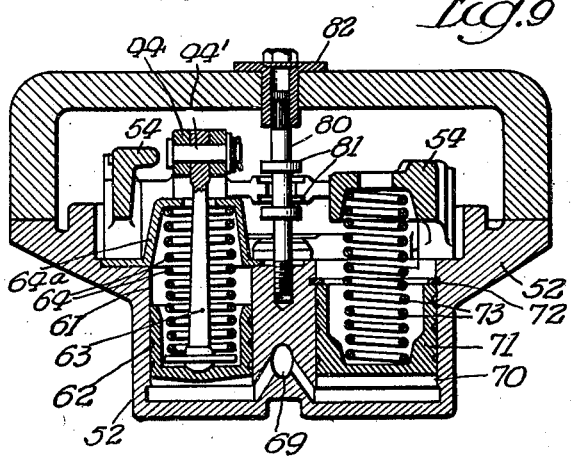
Inventors,
Glen T. Lampton
Paul F. Hackethal
Arthur T. Briggs
By Fred Gerlach
their Atty.

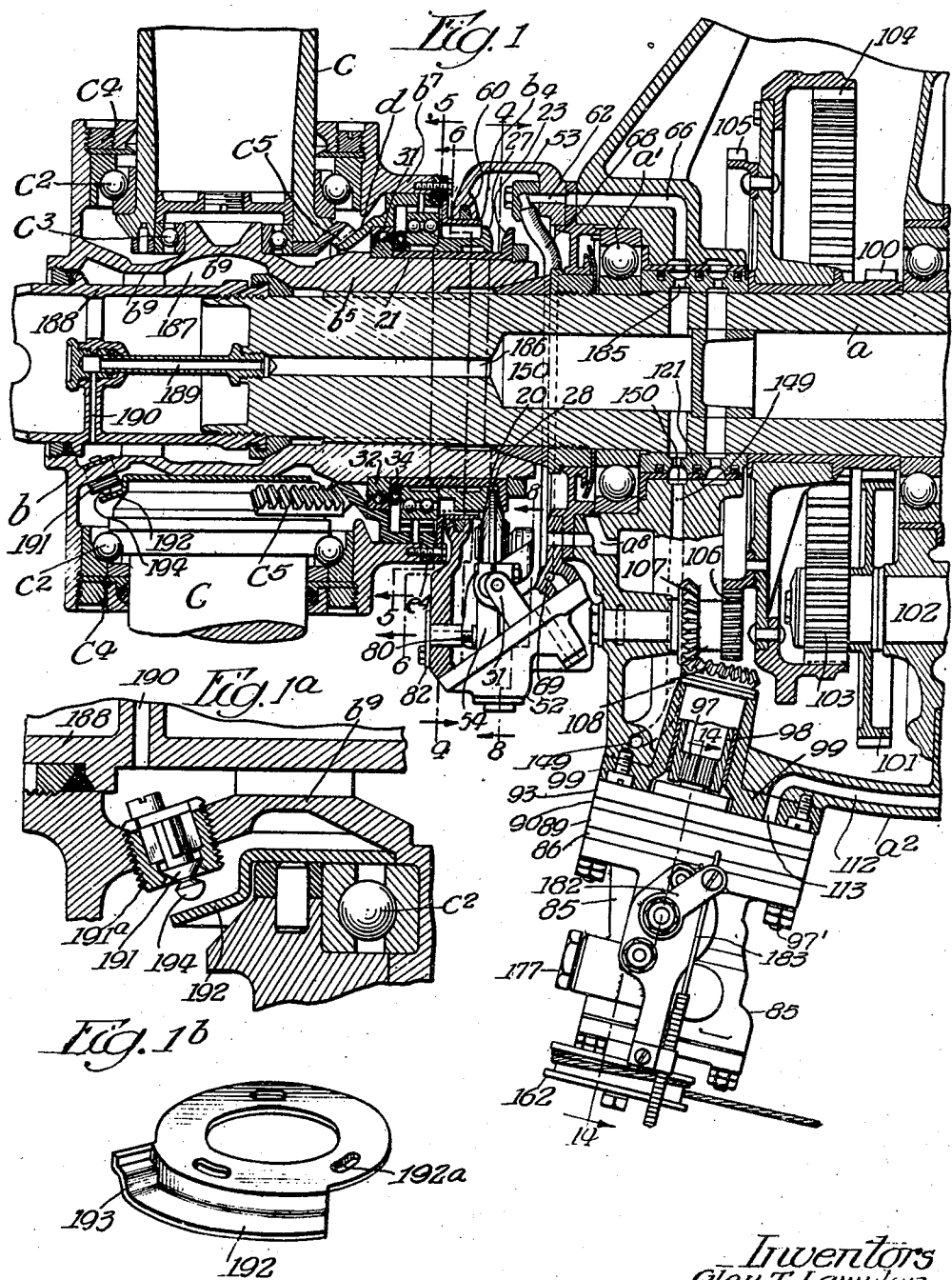

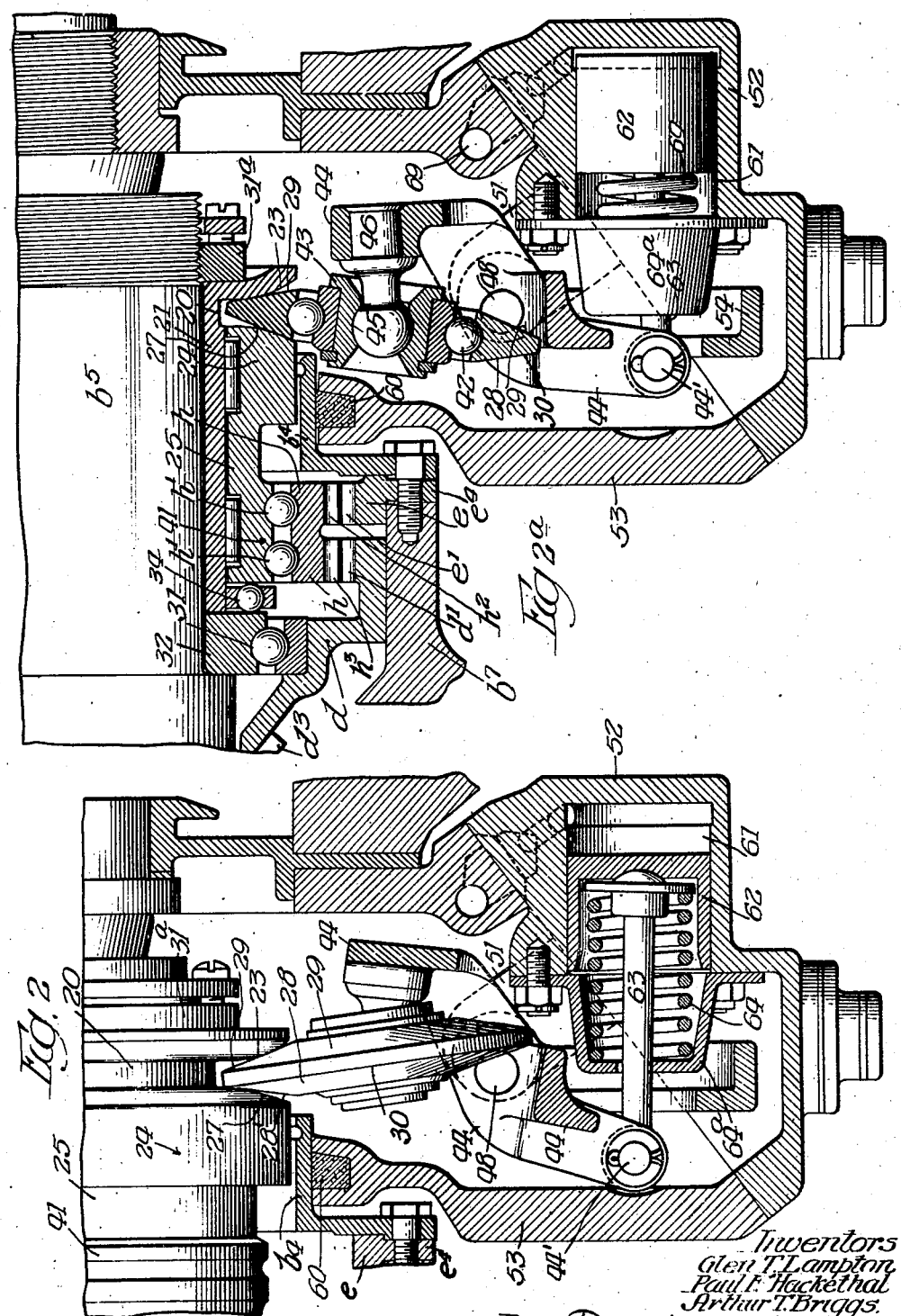

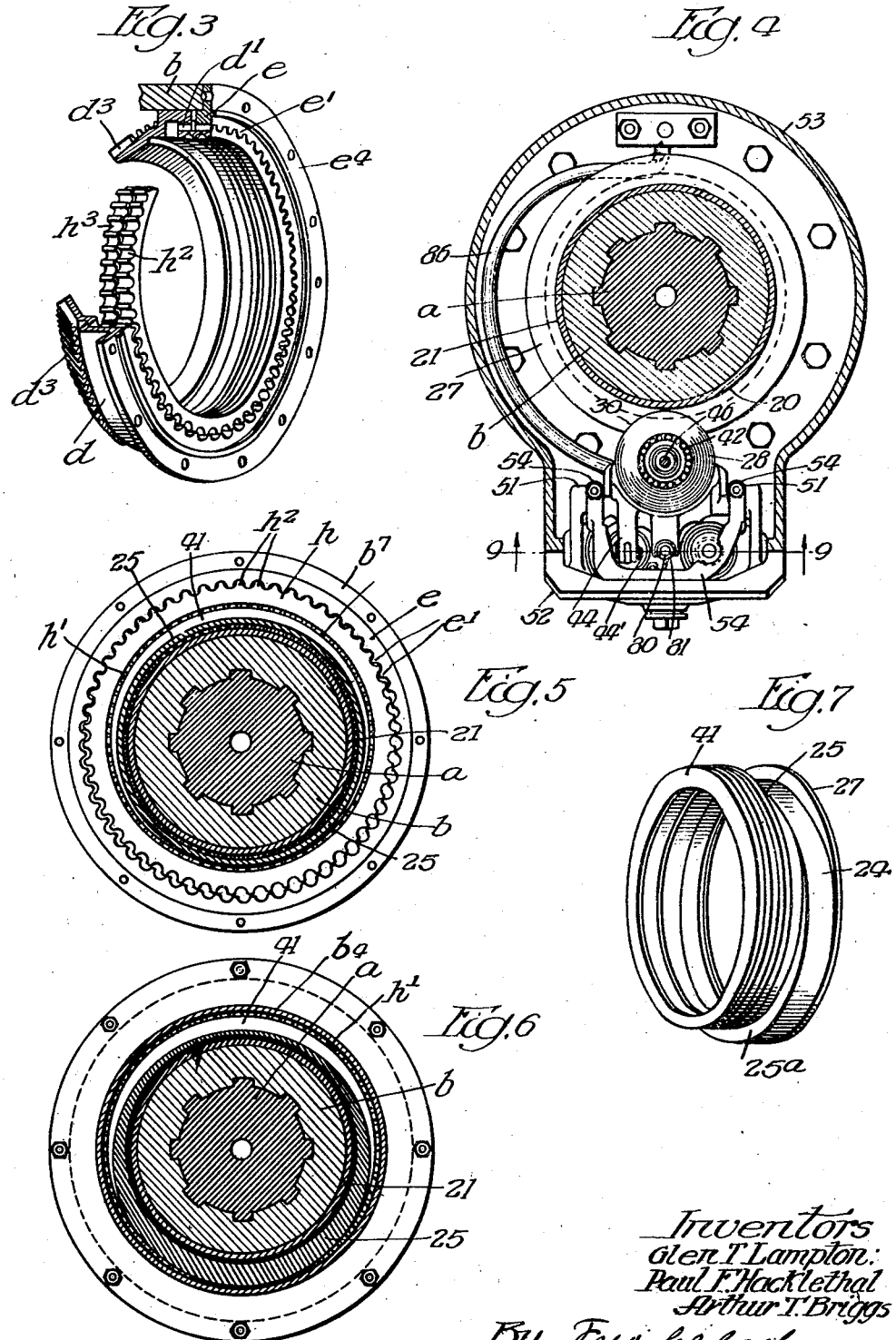

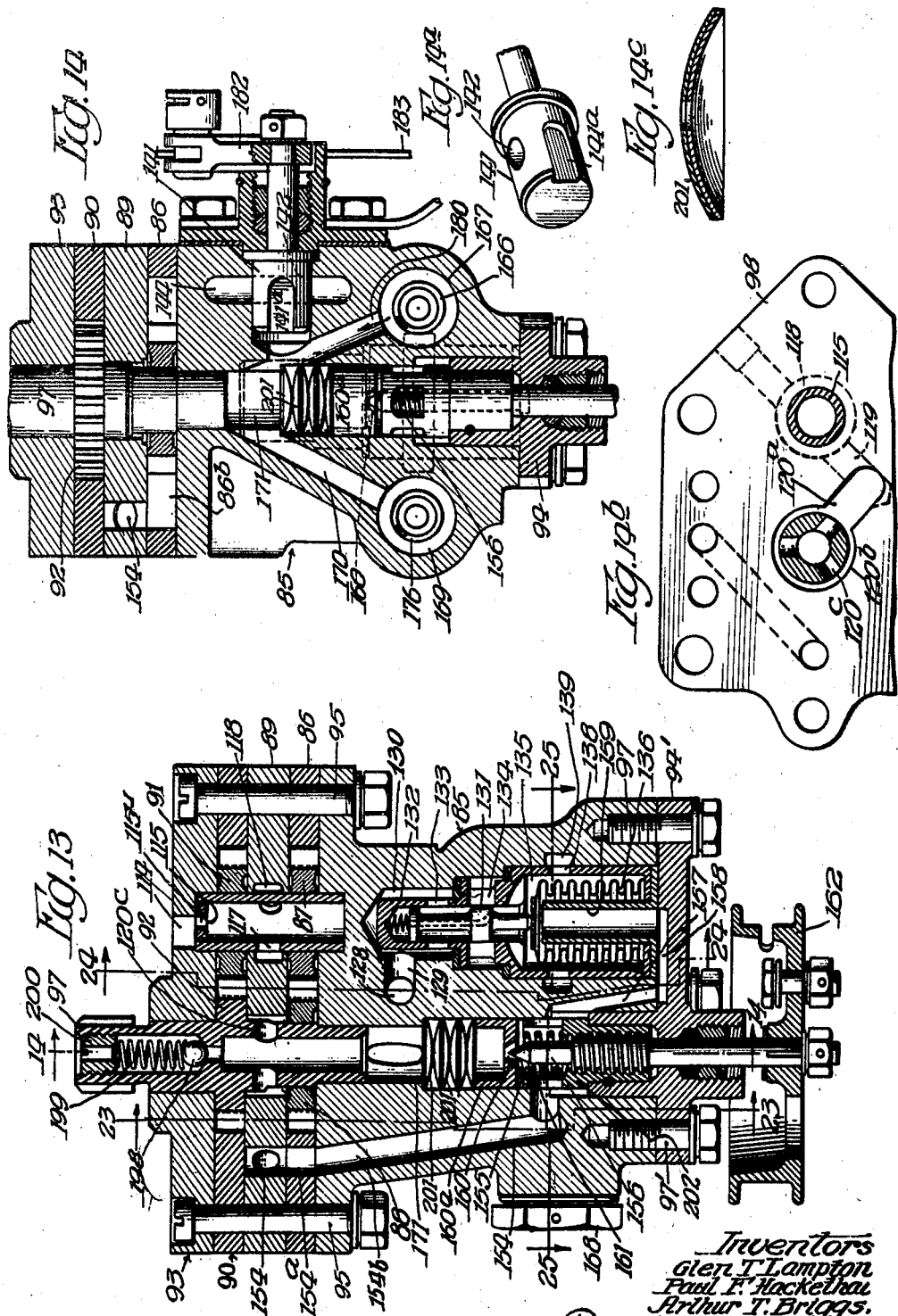

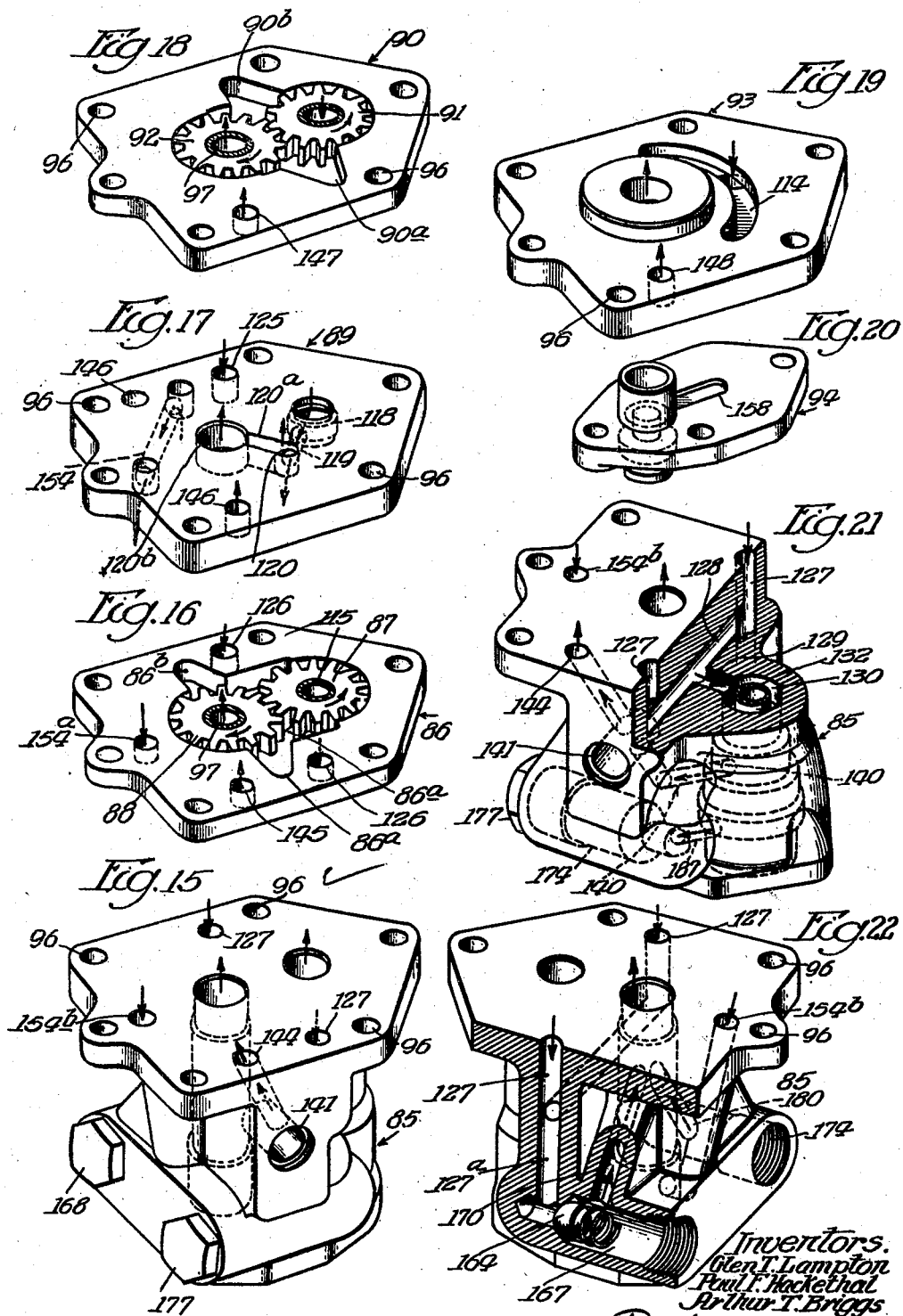

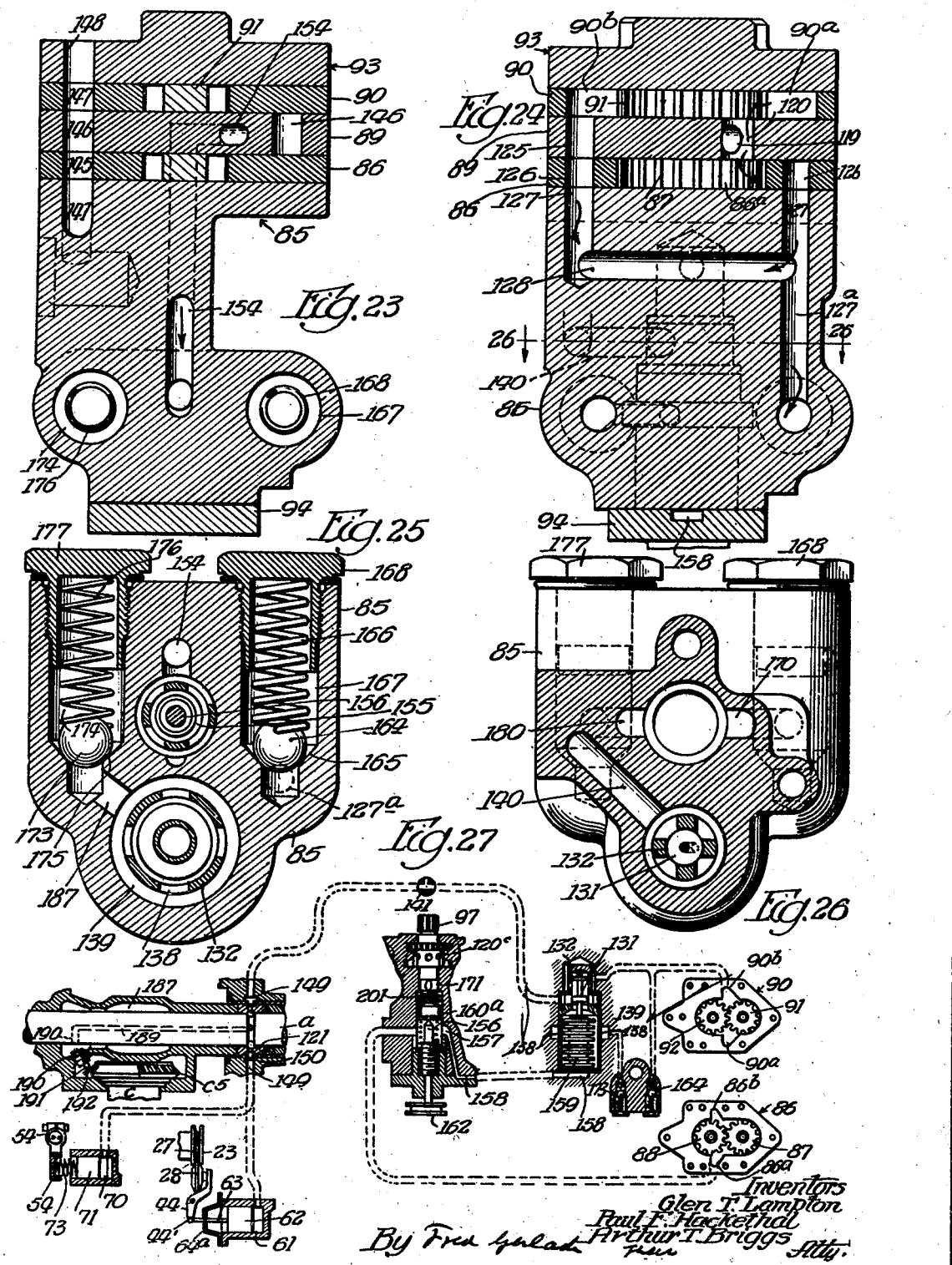

Patented May 26, 1942

2,284,154

UNITED STATES PATENT OFFICE 2,284,154

AUTOMATIC CONTROLLABLE PITCH PROPELLER

Glen T. Lampton, Paul F. Hackethal, and Arthur T. Briggs, Williamsport, Pa., assignors, by mesne assignments, to The Aviation Corporation, New York, N. Y., a corporation of Delaware Application July 16, 1937, Serial No. 153,926

13 Claims. (Cl. 170—163)

The invention relates to hydraulic controlling means for variable pitch-propellers.

The objects of the invention are to provide an improved hydraulic control in which: a pump responsive to variations in engine-speed is used to control the valve which governs the pressure of fluid for controlling the variable pitch-mechanism; a pulley for actuating the pitch-change gearing is automatically controlled for pitch-changes; gear-pumps are used to produce characteristic changes which follow the pressure lines desired better than volume lines and cause the pressure to respond more quickly to changes in the engine-speed; the pressure differential between fluid from two gear-pumps is utilized for efficient and quick variation in pressure responsive to speed-changes in the engine; the pump, automatic pressure-control valve, speed-control valve and pressure relief valves are all included in a unitary assembly for application to the housing on the engine; the governor-unit containing the pumps is provided with a reversible plate for adapting the governor-unit for operation with either a right or left-hand engine without change in the gearing for driving the unit; the governor-unit is built up of a body and a series of plates for ready assembly and disassembly for inspection or repair; a check-valve controlled by one of the blades is utilized to limit the pitch-variation of the blades; and other objects which will appear from the detailed description.

The invention consists in the several novel features which are hereinafter set forth and are more particularly defined by claims at the conclusion hereof.

In the drawings: Fig. 1 is a longitudinal section of a propeller embodying the invention. Fig. 1a is a detail section of the valve for limiting the pitch reduction. Fig. 1b is a perspective of the device for opening the low-limit pitch valve. Fig. 2 is a longitudinal section, illustrating the pivoted friction-pulley set for driving the pitch-change gearing to decrease the pitch of the blades, parts being shown in elevation. Fig. 2a is a similar view illustrating the friction-pulley set for increasing the pitch of the blades, parts being shown in elevation. Fig. 3 is a sectional perspective of the gearing between the eccentric and the gear-segments on the propeller-blades. Fig. 4 is a transverse section on line 4—4 of Fig. 1. Fig. 5 is a section on line 5—5 of Fig. 1. Fig. 6 is a section on line 6—6 of Fig. 1. Fig. 7 is a perspective of the driven element of the friction gearing. Fig. 8 is a section on line 8—8 of Fig. 1. Fig. 9 is a section on line 9—9 of Fig. 4. Fig. 10 is a section on line 10—10 of Fig. 8. Fig. 11 is a detail section on line 11—11 of Fig. 8 of the pivotal mounting for the shifter yokes for the friction pulley. Fig. 12 is a detail perspective of said pivotal mounting. Fig. 13 is a longitudinal section through the hydraulic pumping and control unit. Fig. 14 is a section on line 14—14 of Fig. 13. Fig. 14a is a detail perspective of the pitch-fixing valve. Fig. 14b is a plan of the reversible plate in the governor-unit. Fig. 14c is a section of one of the bi-metallic washers applied to the safety valve seat. Fig. 15 is a perspective of the body of said unit. Fig. 16 is a perspective of the gear-pump for supplying fluid for actuating the automatic pressure-control valve for the pitch-change control. Fig. 17 is a perspective of the plate imposed on the pump shown in Fig. 16. Fig. 18 is a perspective of the actuating pump for the hydraulic fluid for shifting the friction-pulley of the pitch-change mechanism. Fig. 19 is a perspective of the top plate of the pumping unit. Fig. 20 is a perspective of the bottom plate or head for the body of the pumping unit. Fig. 21 is a sectional perspective illustrating some of the ports in the body of the pumping unit. Fig. 22 is a perspective illustrating other ports in the body of the pumping unit. Fig. 23 is a section on line 23—23 of Fig. 13. Fig. 24 is a section on line 24—24 of Fig. 13 through said valve. Fig. 25 is a section on line 25—25 of Fig. 13. Fig. 26 is a section on line 26—26 of Fig. 24. Fig. 27 is a diagram of the fluid connections of the control system.

The improved hydraulic control mechanism is exemplified with an airplane propeller comprising an engine-driven shaft $a$, a hub $b$ keyed to the shaft, and propeller-blades $c$ provided with shanks supported in ball-bearings $c^2$, $c^3$ in the hub. Shaft $a$ is journaled in ball-bearings $a'$ in a stationary housing $a^2$. Outward thrust-members $c^4$ retain the blades in the hub.

A bevel-gear segment $c^5$ is fixed to the inner end of each blade $c$. A gear-ring $d$ rotatable in the hub $b$ has external teeth $d^3$ which mesh with segments $c^5$ on all of the propeller-blades to rotates the blades for pitch-variation. Gear-ring $d$, journaled on ball-bearing 31, is carried in the hub and has an internal series of gear-teeth $d'$ at its inner end. A gear-ring $e$ with internal gear-teeth $e'$ corresponding to those on gear-ring $d$ is fixed to the inner projection of the hub portion $b^7$, by means of a flange $e^4$.

The pitch-change gearing comprises: a friction driving-element 20 integral with sleeve 21 which surrounds the hub portion $b^5$, is locked to the hub $b$ which rotates with shaft $a$, and is provided with a radial flange having an annular convex driving face 23 on one of its side faces; a complementary friction driven element 24 integral with a sleeve 25 journaled on sleeve 21 of driving element 20 and provided with an integral radial flange having an annular convex friction-face 27 opposite and spaced from the friction-face 23 of element 20; and a friction-pulley 28 which has conoidal friction-faces 29 and 30 on its opposite sides which engage, respectively, the convex driving-face 23 and the driven face 27 to drive element 24 from element 20. Pulley 28 is pivotally mounted, as hereinafter described, so it can be angularly set to increase or decrease the speed of the driven element 24 relatively to the driving-element 20, the shaft $a$ and hub $b$, which rotate together, by engaging the pulley with the driving face 23 and the driven face 27 at relatively different radii. Driving element 20 is confined against longitudinal movement on hub portion $b^5$ between one race 32 of the bearing 31 and a collar $31^a$. A series of balls 34 between the outer end of hub 25 of driving element 24 and race 32 receives the forward thrust on element 24.

Driven element 24 has an integral eccentric 41 on its outer periphery. A gear-ring $h$, journaled on ball-bearings $h'$ and concentric with the eccentric 41, has a series of external teeth $h^2$ meshing with the internal teeth $e'$ of ring $e$ and a corresponding series of teeth $h^3$ meshing with the teeth $d'$ of ring $d$. External teeth $h^3$ are at least one less in number than $h^2$, and $h^2$ and $h^3$ are respectively at least one tooth less in number than the corresponding series of teeth on rings $e$ and $d$. All of the teeth $h^2$, $h^3$, $d^1$, and $e^1$ are of conjugate form adapted for positive driving without interference when rolled one upon the other as the result of the bodily rotation of eccentric 41 and the resultant rotation of the ring $h$ around said eccentric. Each rotation of eccentric 41 relative to the hub causes teeth $h^2$ to traverse the internal teeth $e^1$ on the ring $e$ which is fixed to the hub $b$, and by reason of the lesser number of teeth on $h^2$ on the eccentric ring $h$ than on the fixed ring $e$, the said eccentric ring $h$ will rotate relative to the hub and in the direction of rotation of the eccentric 41 an angular distance corresponding to one tooth on $h^2$ if one is the difference in number of teeth between $h^2$ and $e'$. At the same time teeth $h^3$ on eccentric ring $h$ are traversing the internal teeth $d'$ on rotatable ring $d$ and by reason of the greater number of teeth $d'$ than $h^3$ the said rotatable ring $d$ will rotate relative to the eccentric ring $h$ and in a direction opposite to the rotation of the eccentric 41 an angular distance corresponding to one tooth on $h^2$ if one is the difference in the number of teeth between $d'$ and $h^3$. The relative motions between the eccentric ring $h$ and the fixed ring $e$ and between the said eccentric ring and the rotatable ring $d$ are in opposite directions and the net angular distance moved by the rotatable ring $d$ relative to the ring $e$ fixed to the hub is for one rotation of eccentric 41 relative to the hub $b$ the difference between the angular distances corresponding to one tooth of $h^2$ and one tooth of $h^3$. Rotation of eccentric 41 in or relative to the hub rotates gear ring $d$ in the direction of rotation of said eccentric and rotates meshing segments $c^5$ and blades $c$ on their axes with a large mechanical advantage for pitch-variation. When the element 24 and eccentric 41 rotate with the hub and not relatively thereto, the pitch-change gearing will remain neutral and keep the blades at their set pitch. The driven element 24 is provided with an integral counter-balance $25^a$ to balance the eccentric on element 24. Friction-faces 23, 27 are outwardly divergent and the friction-faces of pulley 28 are convergent to permit the pulley to be angularly adjusted while both of its faces remain in driving contact with faces 23, 27. When no pitch-change is desired, the axis of pulley 28 is parallel to the axis of shaft $a$, it contacts faces 23, 27 on equal radii from the axis of shaft $a$ and they contact pulley-faces 29, 30 on equal radii. The pulley will then be neutral and rotate idly without producing any relative rotation between elements 20, 24 which will rotate with the hub while pulley 28 will rotate on its own axis without effecting any relative movement between said elements. Gear-rings $d$, $e$, $h$ will all rotate with the hub $b$ without operating the pitch-change gearing, so that the pitch of the blades will remain fixed.

When pulley 28 is swung in one direction, as shown in Fig. 2, the radius of the contact on driving face 23 is increased, the radius of its contact on pulley-face is decreased, the radius of contact on pulley-face 30 is increased, and the radius of contact on driven face 27 of element 21 is decreased. This will cause the pulley 28 to rotate element 24 and eccentric 41 in the hub, in the direction of rotation of the propeller so that the eccentric gear-ring $h$ will be rotated inside of gear-ring $e$ and advance the gear-ring $d$ and drive it faster than the hub. This will rotate segments $c^5$ to decrease the pitch of the blades.

When pulley 28 is tilted in the opposite direction (Fig. 2$^a$) the radius of the contact on driving face 23 will be decreased, the radius of the contact on pulley-face 29 will be increased, the radius of the contact on pulley-face 30 will be decreased, and the radius of the contact on the face 27 of driven element 24 will be increased. In this position element 24 and eccentric 41 will be rotated in the hub $b$ in the direction opposite to the rotation of the propeller. This will cause the gear-ring $d$ to be rotated with the hub by eccentric 41 at a lower speed than the hub $b$. The rolling movement of the gear-ring $h$ in ring $e$ will then effect, through gear-teeth $h^3$ and gear-teeth $d'$ on ring $d$, rotation of segments $c^5$ to increase the pitch of the blades.

Pulley 28 is journaled on a ball-bearing 42 carried by a hub 43. A universal or ball-and-socket joint 45 between hub 43 and a stud 46 which is fixed to the cross-member of a yoke 44, supports the hub and pulley 28 for variation of its angular relation with the convex friction-faces 23, 27. Yoke 44 is pivoted on coaxial pintles 48 to swing transversely of pulley 28. When yoke 44 is swung in either direction, the axis of the joint 45 will be shifted longitudinally of shaft $a$ and the angular relation between the friction-faces on pulley 28 and the convex friction-faces 23, 27 will be varied to vary the radii of the contacts between said faces for varying the speed of rotation of element 24 and eccentric 41 in the hub. The outer portion of pulley 28 remains between elements 20, 24 while its axis is shifted by stud 46. The universal joint 45 and the engaging friction-faces of pulley 28 and friction-faces 23, 27 control the angular position of the pulley. Yoke 44 is pivoted to swing joint 45 longitudinally of shaft $a$ to vary the radial lengths of the contacts between the friction-faces of the pulley and elements 20, 24 for speed variation and to permit both faces of pulley 28 to be in operative contact with faces 23, 27, respectively.

Fluid pressure mechanism for shifting yoke 44 to control the angular settings of pulley 28 comprises a cylinder 61 integrally formed with a head 52, a piston 62 in the cylinder, a stem 63 pivoted at 44' to yoke 44 and held by a spring 64 in thrust-engagement with said stem. Spring 64 is between a flange on the inner end of stem 63 and a cap 64ª fixed to head 52.

Pulley 28 and the portion of elements 20, 24 engaged thereby and the piston and cylinder for shifting pulley 28 are disposed around portion $b^5$ of hub $b$ between the hub-portion $b^7$ which surrounds gear-rings $d$, $e$ and the casing $a^2$ and are enclosed by an intermediate housing 53 which is secured to casing $a^2$ and carries a sealing-ring 60 around head $b^4$ fixed to the inner end of portion $b^7$ of hub $b$.

Pivots 48 of yoke 44 are fixedly secured in supporting arms or eccentrices 49 which are pivoted on studs 50 which are fixed in supporting arms 51 on head 52. A yoke 54 is fixedly clamped to the eccentrices or arms 49. When yoke 54 is swung on studs 50 as an axis, pivots 48 on which yoke 44 is pivoted, and the inner pivoted end of yoke 44 will swing to and from the axis of the driving and driven elements 20, 24 while the yoke 44 is free to rock on pivots 48 and in the socket of the universal joint 45. Conoidal faces of pulley 28 are free to adjust themselves for the varying contact with the faces 23, 27 on different radii. Yoke 54 is adapted to shift the axis of pulley 28 slightly to and from the driving and driven elements to provide for proper contact on different radii between the pulley-faces and the driving and driven elements.

To provide for loaded engagement between the pulley 28 and the friction-surfaces 23, 27 in all positions of the pulley, yoke 54 is operable by fluid pressure means which comprises a cylinder 70 in head 52, a piston 71, and a spring 73 between said piston and yoke 54. Oil under pressure corresponding to the pressure in cylinder 61 flows to the closed end of cylinder 70 from duct 69 which supplies oil to cylinder 61. A stop-ring 72 limits the outward movement of piston 71. The spring 73 and the fluid pressure in cylinder 70 apply yielding pressure to the yoke 54 to rock the yoke around fixed pivots and move pivot-pins 48 of yoke 44 toward the axis of propeller-shaft $a$, so that the friction-faces 28', 29 of pulley 28 will be forced into engagement with friction-surfaces 23, 27 in all angular settings of the pulley. Spring 73 is sufficient, under variations of pressure in cylinder 61, to exert sufficient yielding pressure on yoke 54 to force pulley 28 against surfaces 23, 27. The proportions of spring 73 and the travel of piston 71 allow complete unloading of the pressure between pulley 28 and surfaces 23, 27 when the fluid pressure is removed from cylinder 70.

Pulley 28 and its operating mechanism, including yokes 44, 54 and their operating mechanism, are mounted on head 52 which is secured to the intermediate housing 53 to permit the unitary removal of all of the parts carried by said head for inspection or repair. The head closes the opening in the housing 53 through which said parts are insertable and removable.

A pin 80 is screw-threaded into head 52 and is provided with stops 81 for limiting the movement of the yoke 44. The outer end of said pin is splined to a cap 82 which is rotatably mounted in the front-wall of housing 53. By rotating the cap, the pin can be adjusted to position limit-stops 81 on pin 80 relatively to the element 20, 24.

The casing of the governor for the fluid for controlling the pitch-change mechanism is built up of a body-member 85 (Fig. 15); a plate 86 (Fig. 16) which fits over body 85 and forms a casing for a pressure control pump consisting of intermeshing gear-elements 87, 88; a reversible plate 89 (Fig. 17) which fits over plate 86; a plate 90 (Fig. 18) which fits over plate 89 and forms a housing for an actuating pump consisting of gear-elements 91, 92; a cover-plate 93 (Fig. 19) which fits over plate 90; and a bottom-plate 94 (Fig. 20) which fits on the bottom of, and is secured by bolts 97', to member 85. Member 85 and plates 86, 89, 90 and 93 are secured together in superposed relation, by bolts 95 to form a unit which is adapted to be secured to the lower portion of casing $a^2$ by four bolts which pass through holes 96 in said body and series of plates. A head 99 is secured between the top of the governor casing and casing $a^2$.

Gear-elements 88, 92 are coaxial and are driven by a sleeve or hollow shaft 97 (Fig. 13) which is integral with element 92, keyed to element 88, journaled in body 85 and plate 93, and extends above plate 93 for detachable connection to a hollow drive-shaft 98 which is journaled in head 99 (Fig. 1). The pumps are driven at or proportionate to the speed of propeller-shaft $a$ and hub $b$, so they will vary with the engine speed for automatically controlling the pitch of the propeller blades. The driving mechanism for these pumps comprises a pinion 100 fixed to propeller-shaft $a$; a gear 101 which is mounted on a stud-shaft 102 supported in housing $a^2$ and meshes with pinion 100; a pinion 103 fixed to rotate with gear 101 and meshing with an internal gear 104 which is rotatable around shaft $a$; a gear 105 fixed to gear 104; a pinion 106 meshing with gear 105; a bevel-pinion 107 rotating with pinion 106; and a bevel-pinion 108 on the upper end of hollow shaft 98, to which pump-shaft 97 is detachably coupled. Gear-elements 87, 91 are journaled on a hollow shaft 115 which fits in body 85 and plates 89, 93.

Oil under pressure from the engine flows through a duct 112 in casing $a^2$, a duct 113 in head 99, an arcuate groove 114 in the top of plate 93 which registers with the bore of hollow shaft 115. Shaft 115, through which oil passes from casing $a^2$ to the governor-unit, is closed at one end, except for a small orifice 115'. This reduces the amount of oil supplied by the engine and at the same time minimizes the effect of oil engine pressure in the governor-unit. By returning the oil from the governor-unit to the inlet side of the pumps and restricting the amount of oil supplied from the engine, any oil not necessary in the governor will flow back to or remain in the sump without passing through the pumps and the only oil required from the engine is sufficient to make up for the loss or consumption in the governor-unit. In the event that the governor is used with an engine which supplies governor oil from a sump at atmospheric pressure, the shaft 115 is turned upside-down so that its fully opened end will be in communication with the inlet 114 to facilitate the delivery of oil to the pumps by gravity. From shaft 115 oil flows through ports 117 to an annular groove 118 around said shaft and in plate 89 and thence through a duct 119 in plate 89 to a through-port 120 which extends vertically of said plate. From port 120 oil flows (Fig. 24) upwardly to the inlet space 90ª at one side of gear-elements 91, 92 of the actuating pump and also downwardly to the inlet-space 86ª between gear-elements 87, 88 of the pressure control pump. These ducts continuously deliver oil under pressure from the engine to both pumps in the governor-unit.

The actuating pump which comprises plate 90 and gear-elements 91, 92 functions to deliver oil under pressure for shifting the pulley 29 to control the operation of the pitch-change mechanism and the pressure control pump which comprises plate 86 and gear-elements 87, 88 forces oil under pressure which varies according to propeller speed, to a valve 131 for governing the pressure of oil in the line to cylinder 61 of the means for shifting pulley 28 and the cylinder 70 for loading said pulley to engage friction-elements 20, 24 of the pitch-change gearing. Oil from the actuating-pump is forced from the outlet side 90ᵇ of the chamber in plate 90 through a vertical port 125 in plate 89, port 126 which extends through plate 86 and registers with port 125, port 127 in body 85 which registers with port 126, cross-port 128 (Fig. 21) in body 85, a branch-port 129, chamber 130 (Fig. 13) around valve-casing 132 which contains the slidable pressure-controlling valve 131, ports 133 in valve-casing 132, and ports 134 which are controlled by valve 131 to control the pressure of the oil to the actuating line for cylinders 61, 70.

From ports 134 the oil passes under reduced pressure through port 140 (Figs. 21 and 26) to the seat of three-way cylinder valve 141 in body 85, through port 142 in valve 141, oblique port 144 in body 85 (Fig. 15), port 145 in plate 86, port 146 in plate 89 (Fig. 17) through port 147 in plate 90, port 148 in cover-plate 93, a duct 149 in housing a² and through head 99, annular channel 150 around an oil-ring 121 on shaft a, duct 66 in housing a², port 62 in housing 53, pipe 68 and a duct 69 which is branched to deliver oil under governed pressure into cylinders 61, 70.

The bearing for hollow shaft 97 in the governor-body 85 extends below the lower end of said shaft to form a chamber 171 to which oil returned from the actuating and governing lines is delivered. From chamber 171 the returned oil passes into the bore of shaft 97 from which it passes to the inlet sides of the gear-pumps or to the casing a² for recirculation. The means for delivering oil from chamber 171 and the bore of shaft 97 to the gear-pumps comprises a slot 120ª which connects the hole 120ᵇ in the reversible plate 89 through which shaft 97 extends and port 119. Said hole 120ᵇ is of sufficient diameter to provide a passage for oil around said shaft. Ports 120ᶜ deliver oil from the lower end of shaft 97 to the hole 120ᵇ, in plate 89, from which it can flow through slot 120ª to the port 119, which delivers the oil to the inlet sides of the gear-pumps. This permits the oil to pass from chamber 171 to the governor-pumps for recirculation of the oil and avoids excessive use of the engine-oil.

Oil from chamber 171 can also pass back to the casing a² through the upper end of shaft 97. A light check-valve 198 is adapted to close the upper end of the bore of hollow shaft 97 and is held against an upwardly facing seat by a spring 199. A plug 200 having a port therethrough is screwed into the upper end of shaft 97 and serves as an abutment for spring 199. This valve 198 insures against air being sucked into the governor through the drive-shaft in lieu of oil through the regular inlet 114, in the event that oil is discharged by the governor at such a rate that the make-up oil is not supplied in sufficient quantity to maintain the entire governor at or above sump pressure.

Some of the oil in the line between cylinder 61 and automatic valve 131 passes under said valve, through valve-casing 132 and ports 138 into an annular channel 139 around said casing. It is desirable to limit the maximum pressure to say, 25 lbs. per square inch, in the governed oil line and, for that purpose, a check-valve is provided in the governor-unit for by-passing the excess to the chamber 171. This valve comprises a ball 173 in chamber 174 in body 85 and a spring 176 for holding valve 173 against seat 175 is held in a cap 177 which is screwed into body 85. Duct 187 connects the reduced end of valve-seat 175 with channel 139 around the casing for bellows 169. Oil which passes valve-ball 173 flows from chamber 174 through duct 180 to chamber 171 for recirculation.

In practice, it is desirable to limit the maximum pressure in the oil-line between the actuating pump and the regulating valve 131, to say 150 lbs. For this purpose, a check-valve is embodied in the governor-unit and comprises a ball 164 held by a spring 166 against a valve seat 165 in chamber 167 which is formed in body 85 and closed by a screw-plug 168. Oil from the pressure side of the actuating gear-pump 91, 92 passes (Fig. 24) through port 125 in reversible plate 89, one of the ducts 126 in plate 86, ducts 127, 128, 127ª to the inlet side of check-valve seat 165. From check-valve chamber 167 the oil which passes the check-valve 164 flows through a port 170 to the chamber 171 for recirculation.

Oil under pressure from the pressure-control pump (86, 87, 88) which is variably responsive to the speed of the engine and propeller, is discharged from its outlet side 86ᵇ and flows through port 154 in plate 89 (Figs. 13, 17), port 154ª in plate 86, duct 154ᵇ in body 85, chamber 155 around a needle-valve 156, duct 157 in body 85, groove 158 in the top-face of bottom-plate 94, and an upstanding pipe 159 into bellows 136. Variation of pressure of oil from the pressure-control pump expands and contracts the bellows 136 to move valve 131 to vary the pressure in the line to cylinders 61, 70 for controlling the operation of the pitch-change gearing, as aforesaid. Needle-valve 156 is mounted in the bottom-plate 94 and is adapted to be screwed to and from a seat 160. A wheel 162 is fixed to the lower end of the stem of valve 156 for connection to a cable which is operable from the pilot's cab to manually adjust the valve and correspondingly control the speed. Seat 160 is formed in a member 160ª which is slidable in the lower end of cylindrical chamber 171 and is pressed upward by a coil-spring 161. This seat acts as a safety device in this line for limiting the pressure of the fluid for controlling valve 131. A pile of bi-metallic dished washers 201 is interposed between a shoulder in chamber 171 and slidable member 160ª. There is clearance between member 160ª and the nut 202 in which needle-valve 156 is mounted. The washers are provided with central openings for the passage of oil from valve-seat 160 to chamber 171. The bi-metallic washers are convex on their high side to expand or give an increase in height with an increase of temperature and are stacked with every other one reversed to cumulate the expansion or increase in height. These washers are so designed that the decrease of pressure on the inside valve-orifice 160 due to decrease of fluid viscosity with rises of temperature is compensated by a corresponding decrease in the needle-valve opening as a result of the movement of seat 160 under the influence of the disk expansion. Spring 161 presses the needle valve-seat member upwardly against the disks.

Valve 131 is responsive to variations of pressure in bellows 136 from the oil-line supplied by the pressure-control pump. When the pressure in the bellows is increased, valve 131 is raised, the area of the passage between the upper ends of passages 134 and said valve is decreased and the area of the passages 134 below valve 131 is increased. Thus, increase of pressure in bellows 136 will reduce the volume of oil flowing to, and increase the outflow from the line to, cylinders 61, 70 and proportionately reduce the pressure in said cylinders to actuate the pulley 28 to operate the pitch-change gearing for a pitch-increase. When the pressure in bellows 136 is reduced, valve 131 will move downwardly, increase the gap between its upper end and the top of passages 134 and decrease the gap between its lower end and passages 134. This will increase the flow to cylinders 61, 70 and reduce the volume of the oil returned for recirculation through chamber 135, ports 138, channel 139, port 187, and check-valve 173 to chamber 171.

Three-way valve 141 fits in a cylindrical socket in body 85 and is provided with a stem to which arm 182 is fixed and so the valve may be controlled by a suitable cable 183 from the pilot's cab. This valve is adapted to close the oil-line between the governor-valve 131 and cylinders 61, 70 when it is desired to operate the propeller at a fixed pitch, and simultaneously drop the pressure in the cylinders 61 and 70 to disengage the friction pulley 28. In its normal position for automatic pitch-control (Fig. 14) valve-port 142 will maintain communication between ports 140 and 144 to deliver oil to cylinders 61, 70. When valve 141 is set to cut off communication between ducts 140, 144, longitudinal groove 141ª in its periphery connects port 144 to chamber 171 for the purpose of relieving pressures in the control system.

Plate 89 is insertable and reversible to adapt the governor-unit for use with either a right or left-hand engine without change in the gearing for driving the pumps. When said plate is in the position illustrated in Fig. 17, port 120 will deliver oil into the side 90ª of the actuating pump-chamber and the discharge will be at the opposite side 90ᵇ. The inlet and outlet sides 89ª, 89ᵇ of the pressure-control pump below plate 89 will be correspondingly disposed. When the engine is such as to drive the pump-gears in the opposite direction from that indicated by the arrows, plate 89 will be inverted and reversed to position the port 120 at the opposite side of the pump-chambers, which will reverse the flow of oil through the pump-chambers. Inlet port 120 is located so that, upon reversal of plate 89, it will deliver oil into the oppositely disposed sides 86ᵇ, 90ᵇ of the pump-chambers.

When the plate 89 is reversed, the inlet end of duct 154 will be in communication with the side 86ª of the pump-chamber in said plate and its outlet end remains in registry with port 154ª and duct 154ᵇ, which lead to the bellows. Plate 86 is provided with a port 126 at each side so that port 125 in reversible plate 89 will deliver oil through plate 86 to one of the ducts 127 from the pressure-side of the actuating-pump while plate 89 is in either of its alternative positions. Body 85 is provided with a duct 127 at either side communicating with ports 126 and cross-connected by duct 128 so that, in either position of reversible plate 89, the oil will be forced to the governor-valve by the actuating-pump. A port 146 is provided at either side of plate 89 so that, in either of its alternative positions, communication will be maintained between port 144 and port 148 which leads to the actuating-line for cylinder 61.

This exemplifies a governor-unit comprising one or two pumps for actuating the pitch-controlling mechanism, which is adapted, without change of the gearing, for operation with either a right or left-hand engine.

The invention comprises automatic low-limit pitch-controlling means for the blades. Oil from channel 150 also passes through oil-ring 121 on shaft $a$ which is provided with an annular groove and port 185 for delivering oil under controlled pressure from channel 150 to duct 186 in shaft $a$. Chamber 187 is formed between wall $b^9$ of the hub and sleeve 188. Pipe 189 and duct 190 in sleeve 188 deliver oil under governed pressure from duct 186 into chamber 187. Check-valve 191 is carried in a casing 191ª which is mounted in wall $b^9$ of the hub. When open, this valve will permit oil from annular channel 150 from which oil is delivered to cylinder 61, to flow into the gear-chamber in the hub. From this chamber oil is returned through duct $a^8$ to housing $a^2$. A cam 192 adjustably fixed to the shank of one of the blades, by means of bolts (not shown) passing through the slots 192ª, is provided with abutment 193 which is adapted to engage stem 194 on the check-valve 191 when the blades reach their low pitch-limit, at which time the abutment will open valve 191 and permit oil to drain from channel 150 (which is in communication with cylinders 61, 70) through shaft $a$, ducts 189 and 190, chamber 187 and valve-casing 191 to the gear-chamber from which it flows through duct $a^8$ back to casing $a^2$. The pressure in the line to cylinders 61, 70 will then be reduced so that operation of the pitch-change gearing to reduce the pitch will be automatically discontinued. This exemplifies automatic means controlled by the governed pressure of oil for controlling the pitch-change mechanism for limiting the pitch-limit in one direction. Since the blades $c$ are interconnected by gearing, only one valve 191 is necessary. Any suitable fixed stop may be used for the high pitch-limit, and, if desired, may be set to allow the blades to assume a position substantially parallel to the axis of the shaft $a$.

The operation of the improved automatic governor for the control of the pitch-change mechanism will be as follows:

When the engine is in operation at the optimum speed, the governed pressure in cylinder 61 will be such that the pulley 28 will be held in its neutral position with its faces 29 and 30 engaging the friction-faces 23, 27 of the variable speed pitch-gearing on equal radii. The pulley will run idly on its own axis without effecting any change in the pitch-change gearing. The actuating-pump of the governor-unit will keep the oil in the line which delivers it to the control-valve 131 under the desired predetermined pressure. The pressure-control pump, operating proportionately to engine-speed, will control the valve 131 and the pressure of the oil in the actuating line between said valve and cylinder 61 to retain the pulley 28 in its neutral position.

If the speed of the engine, either on account of its load, or for other reasons, should be reduced, the speed of the control-pump will be correspondingly reduced, which will correspondingly reduce the pressure of oil in bellows 136. This will cause valve 131 to drop and increase the flow of oil from the actuating-pump past said valve to the line leading to cylinder 61 and increase the pressure therein. This increase of pressure in cylinder 61 will cause its piston 62 to swing pulley 28 into position shown in Fig. 2. The pitch-change gearing will then be operated to reduce the pitch of the blades and the load upon the engine. If the blades are shifted to the low-pitch limit before the engine has accelerated, abutment 193 on one of the propeller-blades will open valve 191, which will permit oil from the annular channel 150 (from which the oil also flows to cylinder 61) to flow through said valve and return to the casing $a^2$. This will reduce the pressure in cylinder 61 sufficiently to cause pulley 28 to be returned to its neutral position and discontinue the pitch-reduction.

When the speed of the engine increases above optimum, the pressure of oil in bellows 136 will be increased. This will lift valve 131 to reduce the flow to, and the pressure of the oil in, cylinder 61 sufficiently to cause piston 62 to shift pulley 28 into position shown in Fig. 2a. This will render the pitch-change gearing operative to increase the pitch of the blades until the engine-speed is reduced to the optimum. In this manner, the pitch-change gearing is automatically controlled for pitch-increase or decrease by the hydraulic governor-mechanism.

When it is desired to operate the propeller at a fixed pitch, the operator will rock valve 142 to cut off the delivery of oil to cylinders 61, 70 for the purpose of relieving pressures in the control-system. The manual adjustment of needle-valve 156 controls the pressure in the line between the pressure control-pump and bellows 136 so that the speed to be maintained under automatic pitch-control may be varied as desired. The spring-loaded valve-seat 160a for needle-valve 156 serves as a safety against excess pressure produced by the pressure-control pump. If the pressure in the line between the actuating-pump and the governor-valve 131 becomes excessive, check-valve 164 will open and return the excess to the gear-pumps for recirculation.

The invention is not to be understood as restricted to the details set forth, since these may be modified within the scope of the appended claims, without departing from the spirit and scope of the invention.

Having thus described the invention, what we claim as new and desire to secure by Letters Patent is:

1. Mechanism for shifting and controlling the blades of a variable pitch propeller comprising variable speed gearing for shifting the blades to vary their pitch, comprising a variable speed pulley, fluid pressure means for actuating the pulley for pitch-changes, a variable pressure pump responsive to the speed of the propeller, and means controlled by variations of pressure produced by the pump for controlling the pressure means to actuate the pulley.

2. Mechanism for shifting and controlling the blades of a variable pitch propeller comprising variable speed gearing for shifting the pitch of the blades to vary their pitch, a fluid pump, means actuated by fluid pressure from said pump for actuating the gearing for pitch-changes, a second pump responsive to the speed of the propeller, and means controlled by variations of the pressure produced by the second pump for controlling the fluid pressure to actuate the gearing.

3. Mechanism for shifting and controlling the blades of a variable pitch propeller comprising variable speed gearing for shifting the pitch of the blades to vary their pitch, a rotary gear fluid pump, means actuated by fluid pressure from said fluid pump for actuating the gearing for pitch-changes, a second pump responsive to the speed of the propeller, and means controlled by variations of the pressure produced by the second pump for controlling the fluid pressure to actuate the gearing.

4. Mechanism for shifting and controlling the blades of a variable pitch propeller comprising variable speed gearing for shifting the pitch of the blades to vary their pitch, a fluid pump, means actuated by fluid pressure from said pump for actuating the gearing for pitch-changes, a rotary gear pump responsive to the speed of the propeller, and means controlled by variations of the pressure produced by the rotary gear pump for controlling the fluid pressure to actuate the gearing.

5. Mechanism for shifting and controlling the blades of a variable pitch propeller comprising variable speed gearing for shifting the pitch of the blades to vary their pitch, a rotary gear fluid pump, means actuated by fluid pressure from the pump for actuating the gearing for pitch-changes, a second rotary gear pump responsive to the speed of the propeller, and means controlled by variations of the pressure produced by the second pump for controlling the fluid pressure to actuate the gearing.

6. Fluid pressure means for controlling and shifting gearing for varying the pitch of a variable pitch propeller comprising a gear pump for fluid for controlling said gearing, a record gear pump responsive to variations in the speed of the propeller, a valve for controlling the actuating fluid responsive to pressure from the second pump, and a casing for said pumps and valve comprising a body containing the valve and separate sections containing said pumps, respectively.

7. Fluid pressure means for controlling and shifting gearing for varying the pitch of a variable pitch propeller comprising a gear pump for fluid for controlling said gearing, a second gear pump responsive to variations in the speed of the propeller, a valve for controlling the actuating fluid responsive to pressure from the second pump, a manually controlled valve, and a casing for said pumps and valve comprising a body containing said pumps, respectively.

8. In fluid pressure means for controlling and shifting gearing for varying the pitch of a variable pitch propeller, the combination of a governor body provided with inlet and outlet passages for fluid, a gear pump in the body for forcing fluid to control said gearing, a valve in the body for controlling the pressure of fluid to said gearing, fluid pressure means in said body for controlling the governor valve, a manually controlled valve for controlling the pressure of fluid for operating the pressure control valve comprising a needle and a movable seat operable by pressure to vary the flow of oil from the manually controlled valve.

9. In fluid pressure means for controlling and shifting gearing for varying the pitch of a variable pitch propeller, the combination of a governor body provided with inlet and outlet passages for fluid, a gear pump in the body for forcing fluid to control said gearing, a valve in the body for controlling the pressure of fluid to said gearing, fluid pressure means in said body for controlling the governor valve, a manually controlled valve for controlling the pressure of fluid for operating said means, and means associated with said valve responsive to thermal changes for compensating for variations in viscosity and temperature of the fluid passing the valve.

10. In fluid pressure means for controlling and shifting gearing for varying the pitch of a variable pitch propeller, the combination of a governor body provided with inlet and outlet passages for fluid, a gear pump in the body for forcing fluid to control said gearing, a valve in the body for controlling the pressure of fluid to said gearing, fluid pressure means in said body for controlling the governor valve, a manually controlled valve for controlling the pressure of fluid for operating said means, a yieldable seat, and thermal responsive means for compensating for variations in viscosity and temperature of the fluid passing the valve.

11. Mechanism for shifting and controlling the blades of a variable pitch propeller, comprising variable speed gearing for shifting the blades to vary their pitch which includes a driving element, a driven element, and means for varying the ratio of the speed of the driven element to the driving element, fluid-pressure means for actuating the gearing for pitch-changes, a fluid-pressure pump responsive to the speed of the propeller, and means to which the pump is hydraulically connected, for influencing said first-named fluid-pressure means to effect an increase of pitch by varying speed ratios of the driven element to the driving element, said gearing in response to an increase of pressure and a decrease of pitch by varying speed ratios of the driven element to the driving element in response to a decrease of pressure by the fluid-pressure pump.

12. Mechanism for shifting and controlling the blades of a variable pitch propeller, comprising variable speed gearing for shifting the blades to vary their pitch which includes a driving element, a driven element, and means for varying the ratios of the speed of the driven element to the driving element, fluid-pressure means for actuating the gearing for pitch-changes, a fluid-pressure pump responsive to the speed of the propeller, means to which the pump is hydraulically connected for influencing said first-named fluid-pressure means to effect an increase of pitch by varying speed ratios of the driven element to the driving element in response to an increase of pressure and a decrease of pitch by varying speed ratios of the driven element to the driving element in response to a decrease of pressure by the fluid-pressure pump, and means for predeterminately varying the operation of said influencing means by the pump.

13. Mechanism for shifting and controlling the blades of a variable pitch propeller, comprising variable speed gearing for shifting the blades to vary their pitch which includes a driving element, a driven element, and means for varying the ratio of the speed of the driven element to the driving element, fluid-pressure means for actuating the gearing for pitch-changes, a fluid-pressure pump responsive to the speed of the propeller, means to which the pump is hydraulically controlled for influencing said first-named fluid-pressure means to effect an increase of pitch by varying speed ratios of the driven element to the driving element in response to an increase of pressure by the pump and a decrease of pitch by varying speed ratios of the driven element to the driving element in response to a decrease of pressure by the pump, and a manually-controlled valve for rendering the fluid-pressure means inoperative for operation of the blade at a fixed pitch.

GLEN T. LAMPTON.
PAUL F. HACKETHAL.
ARTHUR T. BRIGGS.